Sept. 18, 1945.    V. O. BOWLES    2,385,189
CATALYTIC REACTOR
Filed Oct. 31, 1941    2 Sheets-Sheet 2

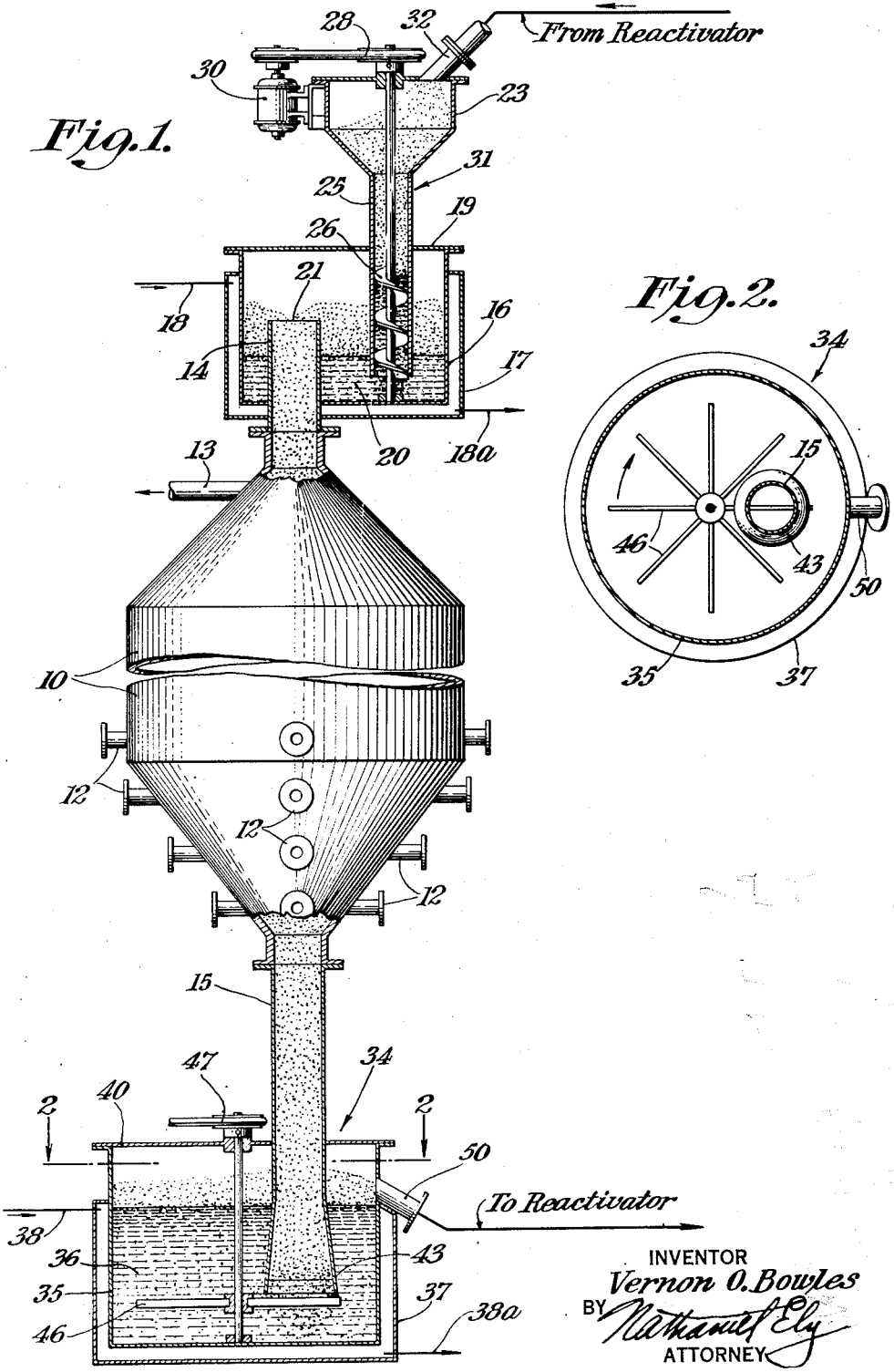

INVENTOR
Vernon O. Bowles
BY
ATTORNEY

Patented Sept. 18, 1945

2,385,189

UNITED STATES PATENT OFFICE 2,385,189

CATALYTIC REACTOR

Vernon O. Bowles, Dobbs Ferry, N. Y., assignor to The Lummus Company, New York, N. Y., a corporation of Delaware Application October 31, 1941, Serial No. 417,360

6 Claims. (Cl. 23—288)

This invention relates to improvements in continuous catalytic reactors and the like and more specifically relates to an improved reactor in which the catalyst is continuously moved into or out of the reaction or conversion chamber.

I am aware that suggestions have heretofore been made for the conversion of chemical compounds or mixtures thereof in the presence of catalysts whereby more selective reaction or operation at lower temperatures or pressures or greater yields of desired product can be obtained. It has been the usual practice, however, to employ a catalyst of granular nature, which remains in a fixed position during the conversion period and frequently also during the reactivation period. Although this procedure results in discontinuous operation, it has been necessary because of the difficulty heretofore in continuous operation of continuously introducing the catalyst into and removing the catalyst from the reaction chamber without loss or contamination of the reactants and without attrition of the catalyst. The extent of the problem involved in continuous catalytic operation will be better appreciated when it is realized that, for a typical petroleum conversion such as the cracking of gas oil, it may be desirable to pass as much as 15 tons of catalyst per hour through the reaction chamber for a charge of 5000 bbl./day of gas oil thereto.

The use in continuous catalytic operation of a liquid seal, particularly a seal of a non-wetting, inert liquid, through which the catalyst is continuously passed into and out of the conversion chamber, has been disclosed in the copending application of A. H. Schutte, S. N. 302,278, filed November 1, 1939, which application has matured into Patent No. 2,268,535, issued December 30, 1941. This procedure not only effectively seals the conversion chamber against loss or contamination of reactants but also reduces the attrition of the moving catalyst to a minimum.

My invention relates to an improved apparatus of the type disclosed in the aforesaid patent of Schutte for effecting continuous catalytic conversion. By means of my improved apparatus the number of moving parts thereof necessary to convey the granular catalytic or other material through the liquid seal is reduced to a minimum.

The principal object of my invention is to provide an improved catalytic reactor in which reactions can be carried out continuously in a more satisfactory manner.

Another object of my invention is to provide an improved apparatus for continuously introducing a granular contact material such as a catalyst into and removing such material from a treating chamber, which apparatus includes conveying means and liquid seals through which the granular material is passed.

A specific object of my invention is to provide an improved apparatus for moving catalytic or other material of a granular nature into and out of a conversion chamber by passage of such material through a non-wetting liquid seal which prevents the escape of reactants but does not hinder the passage of the granular material therethrough and which substantially prevents attrition of the granular material.

Further objects and advantages of my invention will appear from the following description of a preferred form of embodiment thereof taken in connection with the attached drawings illustrative thereof, in which:

Fig. 1 is a diagrammatic elevation with parts broken away and parts in section of a catalytic conversion chamber and the catalyst feed and discharge elements therefor;

Fig. 2 is a horizontal cross section taken substantially along the line 2—2 of Fig. 1;

Figure 3:
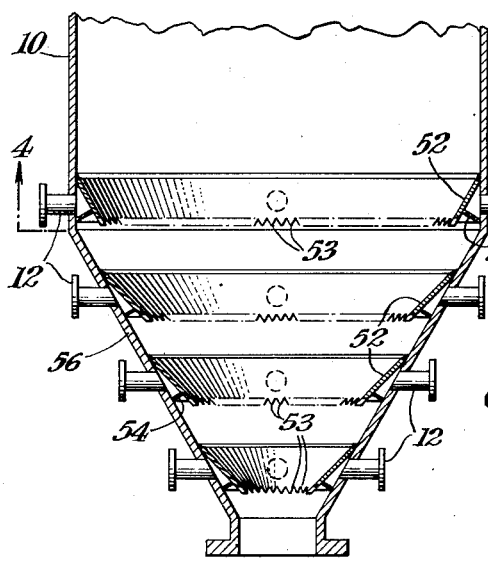
Fig. 3 is a vertical section showing the internal construction of the conversion or reaction chamber.

In accordance with a preferred form of embodiment of my invention, I provide a conversion or reaction chamber, generally indicated at 10, that may be equipped with a plurality of inlet nozzles 12 through which liquid or vaporous reactants are introduced into chamber 10 to undergo a desired reaction or treatment in the presence of a suitable contact material such as a catalyst or the like. Line 13 is provided for the removal of the reacted products from chamber 10. Conduits 14 and 15 are provided for the continuous introduction to and discharge of catalyst, respectively, from the reaction chamber. It is to be understood that the temperature and pressure at which the treatment takes place within the chamber 10 are preferably maintained at the optimum conditions so that the desired conversion can be effected.

For the continuous operation contemplated, it is desirable to employ a contact material in granular form, the size of the granules being selected according to the particular conditions of each conversion. The particles of contact material are preferably of a large mesh size to provide adequate surface area for contact with the reactants without causing excessive pressure drop during passage through chamber 10. The catalyst particles may occupy substantially all the available space in chamber 10; or a plurality of tubes through which the catalyst particles may be passed for contact with the reactants may be provided, in which case a heating or cooling medium such as a molten salt or the like may be circulated through chamber 10 in indirect heat exchange contact with such tubes.

In order to accomplish continuous operation, it is necessary to provide a seal of some sort at the points of catalyst introduction to and discharge from chamber 10 to prevent loss or contamination of reactants since the reaction in chamber 10 is usually carried out at a pressure other than atmospheric. According to my invention, I employ a simplified form of liquid seal construction for this purpose.

This liquid seal construction includes the trap chamber 16, which is suitably jacketed as at 17. As shown, this chamber encloses the upper end of conduit 14, which provides communication with reaction chamber 10. Provision is made at 18 and 18a for passing a heating medium such as flue gas or the like through jacket 17 to maintain chamber 16 at the desired operating temperature. Cover 19 insures that the chamber is kept pressure-tight. Chamber 16 contains a quantity of a liquid, indicated at 20, which provides the seal for the catalyst introduction conduit 14. The height of conduit 14 is preferably such that its upper edge 21 extends sufficiently above the surface of the sealing liquid in chamber 16 to prevent the carrying over of any of such liquid into reaction chamber 10.

The liquid used to effect the seal should have certain characteristics and should be selected with regard to the particular operating conditions employed and the particular treatment or reaction contemplated. Such sealing liquid should have a freezing point sufficiently below and a boiling point sufficiently above the reaction temperature so that slight temperature variations within the catalytic reaction chamber will not alter the physical state of the sealing liquid. The specific gravity of the liquid should preferably be greater than that of the catalyst or other contact material. The liquid should have a high surface tension so that it does not wet or adhere to the catalyst particles in any way, and it should not react chemically with the catalyst; otherwise, the catalytic reaction may not be satisfactorily carried out, or the activity of the catalyst may be adversely affected. It is also preferable that gases dissolve in the liquid to a negligible extent.

The granular catalyst required for the conversion is initially maintained in hopper 23. Attached thereto is a conduit 25 which extends into the trap chamber 16, and through which the catalyst flows by gravity. The length of conduit 25 is preferably such that its lower edge is always below the level of liquid 20 so that there can be no possible escape of reactants therethrough; in addition, its length is such that, even with a superatmospheric pressure in chamber 10, the liquid will extend only part way up the conduit.

As the catalyst passes downwardly through conduit 25 by gravity, the weight of the column of catalyst formed causes the catalytic material to sink below the level of the liquid in conduit 25 and thereby to displace such liquid so that the catalyst granules discharge from the lower end of conduit 25 and rise by reason of their buoyancy to the level of the body of liquid 20. Because an unduly high column of catalyst would be required to displace the liquid to the extent that the catalyst could move through the seal at the point of catalyst introduction to chamber 10, it is preferable to provide means to assist the catalyst in its passage through conduit 25. Such means may conveniently comprise a feed screw conveyor 26 operated by a belt 28 driven by motor 30 to assure a positive feed of the catalyst into the trap chamber 16. The screw 26 need be only long enough to move the catalyst from just above the liquid level in conduit 25 to its lower end, where the buoyancy of the catalyst will cause it to rise through the liquid.

In operation, the catalyst feed conveyor, generally indicated at 31, takes the catalytic material that is continuously fed into hopper 23 through inlet 32 and, by the action of gravity and of the screw 26, forces such material continuously downward through the conduit 25 for discharge below the level of the liquid forming the seal in chamber 16. As the catalyst discharges from conduit 25, its buoyancy causes it to rise to the liquid level; and, because of the continuous action of conveyor 31, it enters conduit 14 through which it continuously passes to the conversion chamber 10.

For continuous discharge of the catalyst from chamber 10, I provide the catalyst discharge conveyor, generally indicated at 34. Its construction is similar to that of catalyst feed conveyor 31 and includes a trap chamber 35 which also contains a liquid sealing medium, indicated at 36, through which the catalyst passes without the escape of reactants. A jacket 37 is provided for the circulation of a heating medium as through lines 38 and 38a. This chamber is likewise tightly closed by a cover 40, through which the catalyst discharge conduit 15 extends to below the level of the sealing liquid 36. The lower portion of conduit 15 is preferably flared as at 43 to prevent arching of the catalyst in its gravity flow therethrough.

As in the case of the catalyst feed conveyor, the weight of the column of catalytic material formed in conduit 15 by gravity flow causes the catalyst to sink below the level of the liquid in conduit 15 and thereby to displace such liquid so that the catalyst discharges from the lower end of conduit 15 and rises to the level of liquid 36. In the case of the catalyst discharge conveyor, where chamber 10 is operated under superatmospheric pressure, no auxiliary screw conveyor need be provided to assist the passage of the catalyst since the height of sealing liquid to be displaced is relatively small as shown. It will be appreciated that, for operation of the catalyst feed conveyor under such conditions, the catalyst is being moved from a zone of atmospheric pressure to a zone of higher pressure.

For the catalyst discharge, however, it may be found necessary to continuously facilitate the removal of the catalyst from below the discharge conduit 15 by suitable means because of the obstruction caused by the failure of the catalyst to flow past the point of discharge. Such means may conveniently comprise a paddle wheel 46, which may be operated by a motor-driven belt 47.

In operation, the catalyst is continuously discharged from conduit 15 and rises to the surface of liquid 36. It is discharged from chamber 35 through outlet 50, positioned above the liquid level therein.

Since the catalyst removed at 50 is usually partially fouled, it is customary to reactivate such catalyst in a suitable reactivator furnace (not shown) or the like. For continuous operation, the reactivated catalyst may be entirely or partly charged through the feed inlet 32 to the catalyst conveyor 31. The flow of the catalyst through the system may readily be regulated by the rate at which it is removed through discharge outlet 50.

Molten metals have been found especially suitable as the liquid sealing medium since most catalytic or contact reactions must be carried out at elevated temperatures. Because of their higher specific gravity, molten metals such as lead are particularly to be preferred when the reaction requires a pressure substantially in excess of atmospheric. Normally liquid materials such as mercury, molten alloys, or the like, may also be used.

Molten lead is found most satisfactory for use with bauxite and similar clay-like catalysts often used in petroleum hydrocarbon reactions. It has a sufficiently high specific gravity so that operating pressures of about 100 pounds per square inch gauge can be used. Furthermore, it has a high surface tension so that it does not wet clay catalysts; it does not react chemically with these catalysts; and it does not materially vaporize at reaction temperatures in the range of 800–1,000° F. Under such conditions, the catalytic dehydrogenation or desulfurization of petroleum hydrocarbons with bauxite or the catalytic cracking or reforming of petroleum fractions with an alumina-silica catalyst or other petroleum converting or refining operations involving a clay-type catalyst may be successfully carried out.

Efficient distribution of the fluid reactants, particularly when they are in the vapor state, into the moving body of catalyst may be effectively carried out by the use of the apparatus shown in Fig. 3. In this construction I position the inlet nozzles 12 in vertically spaced rows, each of which contains one or preferably more of such nozzles. These rows may be spaced equally apart or not as desired to obtain the optimum distribution of the reactants. For each horizontal row of nozzles I provide a baffle, preferably an inverted frusto-conical baffle 52, that serves to shield the inlet nozzle openings from the flowing catalyst (not shown in Fig. 3) and to direct the flow of the reactants. These baffles may be serrated along their lower edges as at 53. They are spaced from the wall of the cylindrically shaped catalyst chamber 10 by a suitable support 54 or the like. This supporting means may conveniently comprise a continuous perforated baffle as shown, which serves to distribute the vaporous reactants introduced through spaced nozzles 12 at a relatively even rate under notched baffles 52 into the catalyst body. Baffles 52 are suitably secured along their upper edge as by welding to the wall of the catalyst chamber 10. The lower portion 56 of the wall of chamber 10, to which part or all of baffles 52 may be attached, has preferably an inverted cone shape as shown to aid in the distribution of the reactants as well as to facilitate the removal of the catalyst. Preferably the uppermost row of nozzles is attached to the cylindrical portion of the wall as shown so that as the incoming reactants are introduced through the several rows of nozzles, they can sweep across the entire cross-section of the chamber. Baffles 52 are so constructed that the slope thereof is steeper than the angle of repose of the catalyst whereby the moving catalyst is not trapped or its flow in any way impeded; however, the slope of all the baffles does not have to be the same.

In operation, vaporous reactants are introduced through nozzles 12, are properly distributed by the distributing baffles 54, and pass downwardly under the baffles 52 for general distribution across the path of flow of the catalyst. It will be noted, that because of the narrowing diameter of the conical portion of the catalyst chamber 10, the vapors will be distributed generally throughout the entire cross-section of the chamber. In the particular form of embodiment shown in Fig. 3, the vapors are initially distributed in spaced, concentric annular rings of flow by reason of the baffle construction. Such distribution takes place with a minimum of pressure drop and jet action. Low pressure drop is obviously advantageous from an operating point of view; and elimination of jet action, as would be obtained by introduction of the vapors through orifices or the like, avoids localized catalyst degradation that would otherwise result. It will be apparent that I provide efficient initial distribution of the vapors with substantially no hindrance to the flow of catalyst.

Figure 5:
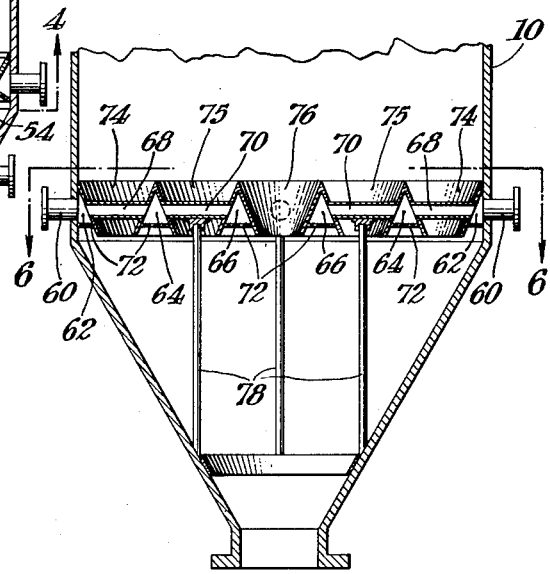
Fig. 5 is a vertical section of the lower part of a conversion or reaction chamber showing a modified form of construction.
Figure 4:
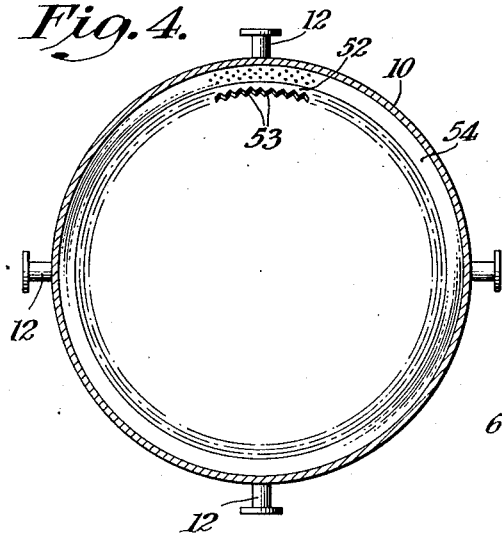
Fig. 4 is a horizontal section taken on the line 4—4 of Fig. 3.
Figure 6:
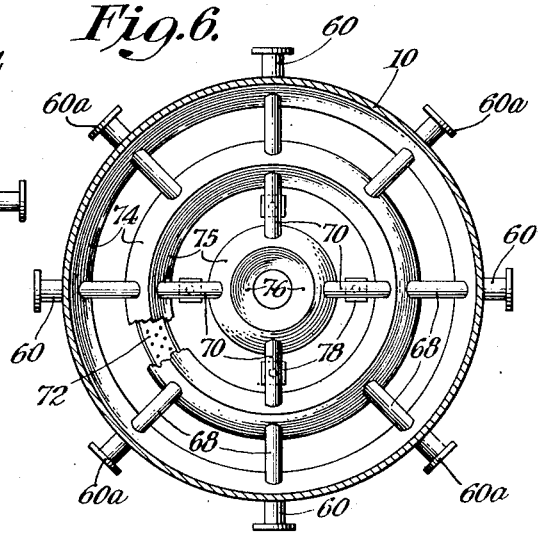
Fig. 6 is a horizontal section taken substantially along the line 6—6 of Fig. 5.

In the modified form of construction shown in Fig. 5, I provide but a single zone of vapor distribution. In this spider-like construction the vapors are introduced through suitably spaced nozzles 60. By means of the multiple concentric annular distribution conduits 62, 64, and 66, which are respectively interconnected by the transverse distribution conduits 68 and 70, I can obtain an efficient distribution of the vapors substantially evenly across the entire cross-section of chamber 10. These concentric conduits are preferably all positioned in the same horizontal plane for ease of construction; but, if desired, the inner conduits may be positioned in lower planes. The concentric vapor distributing conduits are preferably provided with perforated distributing baffles 72, which serve to facilitate the even distribution of the entering vapors throughout chamber 10.

It will be noted that these conduits preferably have an inverted V-shaped cross-section and are closed along their upper edge; thereby they do not materially interfere with the downward flow of the moving catalyst. The flowing catalyst passes downwardly through the multiple concentric catalyst conduits or passages 74, 75, and 76, which preferably have an inverted, annular, frusto-conical cross-section and which occupy the space between the several concentric vapor distributing conduits. These catalyst conduits may also be notched or serrated along their lower edges if desired. The vapor-distributing construction may be supported in any suitable manner as by supporting rods 78. Optional vapor inlet nozzles may be provided as at 60a.

In operation, the vaporous reactants introduced through nozzles 60 are evenly distributed by the distributing baffles 72 and flow upwardly under the lower edges of the catalyst conduits in countercurrent contact with the downwardly moving catalyst body. In this form of embodiment the vapors are also initially distributed in annular rings of flow, and the pressure drop is maintained at a minimum.

It will be appreciated that the vapor distribution arrangements shown in Figs. 3 and 5 are also applicable for use with a catalyst chamber employing a fixed body of catalyst. In such case the problem of proper vapor distribution is equally as important.

The application of my invention is not limited to use in operations requiring the aid of a catalyst. My improved apparatus may be used in any operation in which fluid reactants are to be brought in contact with an appropriate contact material, whether inert or suitably activated. Such an operation may be, for example, the treatment of oils with clay for the removal of gummy constituents and the improvement of color.

I am aware that modifications may be made to the forms of embodiment of my invention disclosed herein; and I, therefore, desire a broad interpretation of my invention within the scope and spirit thereof as disclosed herein and as claimed hereinafter.

I claim:

1. In combination with a chamber adapted to contain a body of granular contact material, means near one end of said chamber to introduce fluid reactants into contact with said granular material in spaced, concentric annular rings of flow throughout the cross-section of said chamber comprising means to introduce fluid reactants into said chamber, a plurality of concentric distribution conduits opening only towards said end of the chamber, and a plurality of transverse distribution conduits interconnecting the reactant introducing means with the concentric conduits.

2. In combination with a chamber adapted to contain a body of granular contact material, means in the lower portion of said chamber to introduce fluid reactants into contact with said granular material in spaced, concentric annular rings of flow throughout the cross-section of said chamber comprising inlet nozzles for the introduction of vaporous reactants into said chamber, a plurality of concentric distribution conduits all in the same horizontal plane, said conduits opening only downwardly, and a plurality of transverse distribution conduits interconnecting the inlet nozzles with the concentric conduits.

3. In combination with a reaction chamber, means for continuously passing a solid catalyst in a divided state into said chamber and downwardly therethrough and outwardly from the chamber, means to seal said chamber against leakage in such passage of the catalyst, distributing means for vaporous reactants within said chamber and comprising annular members constructed and arranged to define a plurality of spaced annular horizontal conduits concentric with respect to a common vertical axis and formed to provide said conduits with sloping outer surfaces arranged to shed the catalyst past the conduits, each of said conduits having an annular bottom wall apertured therearound for restricted and distributed downward discharge of vapor from the conduit, and means for introducing the vaporous reactants into said conduits for distributed flow around the conduits and distributed downward discharge through the apertures of the said bottom walls of the conduits and for upward flow of the so-discharged reactants past the conduits and in countercurrent contact with the catalyst descending within the chamber.

4. In combination with a reaction chamber, means for continuously passing a solid catalyst in a divided state into said chamber and downwardly therethrough and outwardly from the chamber, means to seal said chamber against leakage in such passage of the catalyst, distributing means for vaporous reactants within said chamber and comprising annular members constructed and arranged to define a plurality of spaced annular horizontal conduits concentric with respect to a common vertical axis and formed to provide said conduits with sloping outer surfaces arranged to shed the catalyst downwardly past the conduits, each of said conduits having an annular foraminous bottom wall and an annular inverted trough-shaped channel at the under surface of said bottom wall and defined partly thereby, and piping communicating with each conduit at points spaced around the conduit to introduce the vaporous reactants into said conduits for distributed flow around the conduits and distributed downward discharge through the foramina of the said bottom walls of the conduit into said channels for upward flow of the so-discharged reactants past the conduits and in countercurrent contact with the catalyst descending within the chamber.

5. In combination with a contact chamber, means for passing a solid contact material in a divided state downwardly through said chamber, vapor-distributing means within said chamber and comprising annular members constructed and arranged to define a plurality of spaced annular horizontal conduits concentric with respect to a common vertical axis and formed to provide said conduits with sloping outer surfaces arranged to shed the contact material past the conduits, each of said conduits having an annular foraminous bottom wall and an annular inverted trough-shaped channel at the under surface of said bottom wall and defined partly thereby, and means for introducing vapor into said conduits for distributed flow around the conduits and distributed downward discharge through the foramina of the said bottom walls of the conduit into said channels and for upward flow of the so-discharged vapor past the conduits and in countercurrent contact with the contact material descending within the chamber.

6. In combination with a contact chamber, means for passing a solid contact material in a divided state downwardly through said chamber, vapor-distributing means within said chamber and comprising annular members constructed and arranged to define a plurality of spaced annular horizontal conduits concentric with respect to a common vertical axis and formed to provide said conduits with sloping outer surfaces arranged to shed the contact material downwardly past the conduits, each of said conduits having an annular bottom wall apertured therearound for restricted and distributed downward discharge of vapor from the conduit, and piping communicating with each conduit at points spaced around the conduit for introducing vapor into said conduits for distributed flow therein and distributed downward discharge through the apertures of the said bottom walls of the conduits and for upward flow of the so-discharged vapor past the conduits and in countercurrent contact with the catalyst descending within the chamber.

VERNON O. BOWLES.